No. 12,391. REISSUED SEPT. 19, 1905

G. H. WINSLOW.

HOLDER FOR LENSES OF EYEGLASSES, &c.

APPLICATION FILED APR. 13, 1905.

WITNESSES:
Herbert Bradley.
Fred Kirchner.

INVENTOR
George H. Winslow,
by Christy & Christy, Atty's

UNITED STATES PATENT OFFICE.

GEORGE H. WINSLOW, OF BELLEVUE, PENNSYLVANIA.

HOLDER FOR LENSES OF EYEGLASSES, &c.

No. 12,391. Specification of Reissued Letters Patent. Reissued Sept. 19, 1905.

Original No. 781,260, dated January 31, 1905. Application for reissue filed April 13, 1905. Serial No. 255,465.

*To all whom it may concern:*

Be it known that I, GEORGE H. WINSLOW, a citizen of the United States, residing at Bellevue, in the county of Allegheny and State of Pennsylvania, have invented or discovered certain new and useful Improvements in Holders for Lenses of Eyeglasses, &c., of which improvements the following is a specification.

The invention described herein relates to certain improvements in eyeglasses, particularly of the type in which the lenses are held within wire rims, and has for its object a construction of clamping mechanism whereby the spring and nose-guard are firmly secured to the lens-holder.

The invention is hereinafter more fully described and claimed.

Figure 1:
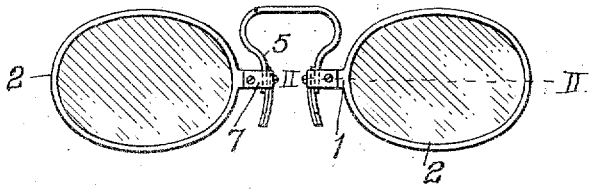
Figure 2:
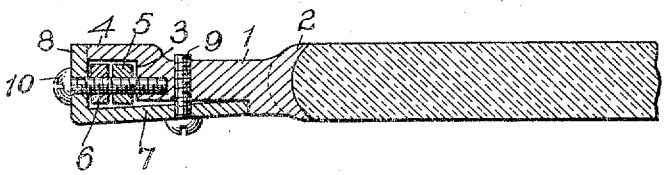
Figure 3:
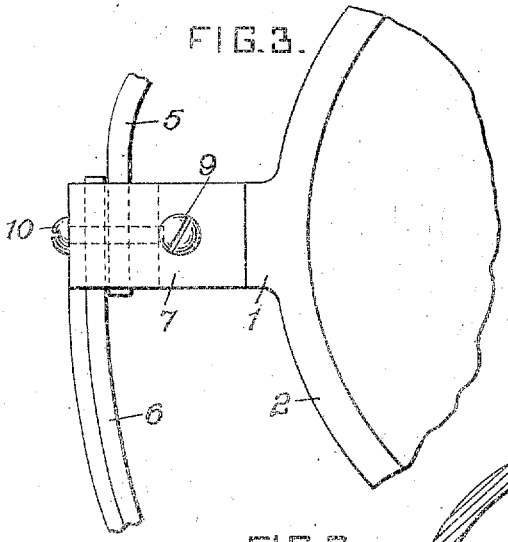
Figure 4:
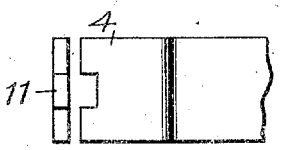
Figure 5:
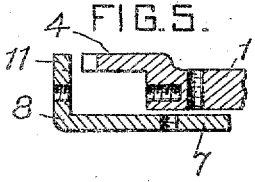

In the accompanying drawings, forming a part of this specification, Figure 1 is a front elevation of a pair of glasses having my improvements applied thereto. Fig. 2 is a sectional view, on an enlarged scale, the plane of section being indicated by the line II II, Fig. 1. Fig. 3 is an elevation, on an enlarged scale, showing one of the clamps. Figs. 4 and 5 are plan and sectional views illustrating a manner of locking one of the clamping members to the other to prevent any twisting of such member, and Fig. 6 illustrates the manner of applying my improvement to a split lens-holding ring.

In the practice of my invention a post 1 is formed, as is customary in the art when the lens is held by a rim or bow, at one end or side of the bow or rim 2, in which the lens is secured. At its inner end this post is notched or recessed to form an abutment or wall 3 and a holding-lug 4. These two parts form two sides of a box or pocket for the reception of the spring 5 and an ear of the nose-guard 6, the opposite sides of the pocket being formed by a plate 7, having at its end a lug 8. This plate 7 is drawn against the post 1, so as to clamp the edges of the spring and ear of the nose-guard between it and the lug 4 by the screw 9, while these parts are laterally clamped between the lug 8 and the wall or abutment 4 by a screw 10, passing through said lug, the spring, and the nose-guard and screwing into the post. By this construction the spring and nose-guard are held in place not only by a clamping action on their outer surfaces, but also by the screw passing through them. The purpose of this construction is not only to provide a box or pocket for the spring and ear on the nose-guard which shall be adjustable in two directions at right angles to each other to solidly grip both the spring and nose-guard, but also to provide a bearing-plate under the heads of each screw, so that the latter shall not become loosened.

As shown in Figs. 4 and 5, the lug 8 and the lug 4 can be locked together, so as to prevent the plate 7 from being turned by lateral pressure of the spring or nose-guard. In the construction shown the lock is formed by notching one of the lugs, as 4, for the reception of a projection 11 on the other lug.

Figure 6:
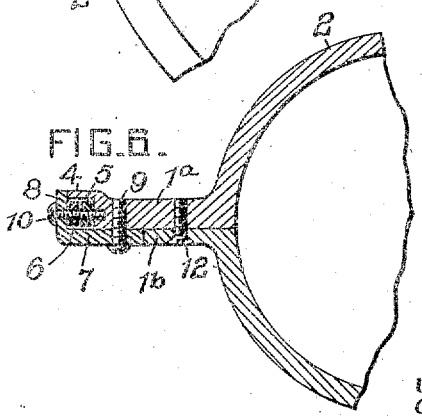

As shown in Fig. 6, the post can be formed into two parts or sections $1^a$ and $1^b$, secured to opposite ends of the bow or rim 2, said parts or sections to be held together by a screw 12.

I claim herein as my invention—

1. Eyeglasses having in combination a post provided with an angular recess, a plate provided with a lug constructed to form with the recess in the post a pocket for the reception of the spring and ear on the nose-guard, screws for moving the plate and lug toward the post whereby the spring and nose-guard are clamped in two directions and means for attaching a lens to the post, substantially as set forth.

2. The combination of a glass-holding rim, a post formed on said rim and provided with an angular recess, a plate provided with a lug forming with the recessed post a pocket for the reception of the spring and ear on the nose-guard and screws for moving the plate and lug toward the post whereby the spring and nose-guard are clamped in two directions, substantially as set forth.

3. The combination of a glass-holding rim, a sectional post having its sections on opposite ends of the rim, one of the post-sections having an angular recess, a plate provided with a lug and forming with the recessed post-section a pocket for the reception of the spring and ear on the nose-guard and screws for shifting the plate, to clamp the spring and nose-guard in two directions, substantially as set forth.

4. Eyeglasses having in combination means for fastening the spring and nose-guard to the post, comprising an L-shaped plate and a post having an L-shaped recess and means for shifting the L-shaped plate so as to clamp the spring and nose-guard in two directions.

In testimony whereof I have hereunto set my hand.

GEORGE H. WINSLOW.

Witnesses:

CHARLES BARNETT,
HERBERT BRADLEY.